(12) United States Patent
Bohm

(10) Patent No.: US 9,709,089 B2
(45) Date of Patent: Jul. 18, 2017

(54) COMBINATION SPHERICAL AND LAMINATED BEARING ASSEMBLY

(71) Applicant: Anthony Carl Bohm, Folsom, CA (US)

(72) Inventor: Anthony Carl Bohm, Folsom, CA (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/042,572

(22) Filed: Feb. 12, 2016

(65) Prior Publication Data

US 2016/0238069 A1    Aug. 18, 2016

Related U.S. Application Data

(60) Provisional application No. 62/115,437, filed on Feb. 12, 2015.

(51) Int. Cl.
| | |
|---|---|
| *F16F 1/40* | (2006.01) |
| *F16C 23/04* | (2006.01) |
| *B64C 13/30* | (2006.01) |
| *F16C 11/06* | (2006.01) |
| *F16C 27/06* | (2006.01) |
| *F16C 21/00* | (2006.01) |
| *F16C 23/08* | (2006.01) |

(52) U.S. Cl.
CPC ............ *F16C 23/045* (2013.01); *B64C 13/30* (2013.01); *F16C 11/0614* (2013.01); *F16C 21/00* (2013.01); *F16C 23/084* (2013.01); *F16C 27/063* (2013.01); *F16F 1/40* (2013.01)

(58) Field of Classification Search
CPC .. F16C 23/045; F16C 11/0614; F16C 23/084; F16C 27/063; F16F 1/40; B64C 1/40

USPC ......................................................... 267/297
See application file for complete search history.

(56) References Cited

U.S. PATENT DOCUMENTS

| | | | |
|---|---|---|---|
| 4,268,094 A | 5/1981 | Greene | |
| 4,424,962 A | 1/1984 | Johnston | |
| 4,986,735 A * | 1/1991 | Robinson | ................ F16F 1/393 |
| | | | 416/134 A |

(Continued)

FOREIGN PATENT DOCUMENTS

EP        2531725 B1    4/2014

OTHER PUBLICATIONS

Office Action dated Sep. 26, 2016, from co-pending U.S. Appl. No. 14/645,467.

*Primary Examiner* — Thomas Irvin
(74) *Attorney, Agent, or Firm* — Mark Ussai; SKF USA Inc. Patent Dept.

(57) ABSTRACT

A bearing assembly for coupling first and second members includes a housing coupled with, or integrally formed with the first member, a laminated bearing section and a spherical bearing section, each section disposed within a housing bore. The laminated bearing section is configured such that at least a portion of the laminated bearing section flexes when torque on the first and second members is less than a predetermined value. The spherical bearing section is configured such that a spherical bearing inner member slidably displaces within a spherical bearing outer member when torque on the first and second members is at least the predetermined value.

11 Claims, 10 Drawing Sheets

(56) References Cited

U.S. PATENT DOCUMENTS

| | | | |
|---|---|---|---|
| 5,092,738 A * | 3/1992 | Byrnes | B64C 27/51 |
| | | | 416/134 A |
| 5,110,259 A | 5/1992 | Robinson | |
| 5,460,487 A | 10/1995 | Schmaling et al. | |
| 5,902,050 A | 5/1999 | Balczun et al. | |
| 5,913,659 A * | 6/1999 | Doolin | B64C 27/008 |
| | | | 267/141.4 |
| 6,695,583 B2 | 2/2004 | Schmaling et al. | |
| 7,290,985 B2 * | 11/2007 | James | B64C 27/56 |
| | | | 416/1 |
| 7,866,025 B2 * | 1/2011 | James | B64C 27/56 |
| | | | 29/458 |
| 8,275,585 B2 | 9/2012 | Cunningham et al. | |
| 8,336,185 B2 * | 12/2012 | James | B64C 27/56 |
| | | | 29/458 |
| 8,568,034 B2 * | 10/2013 | Johnson | B23P 9/025 |
| | | | 29/270 |
| 8,632,062 B2 * | 1/2014 | James | B64C 27/35 |
| | | | 267/140.2 |
| 2012/0134741 A1 | 5/2012 | James et al. | |
| 2013/0341458 A1 | 12/2013 | Sutton et al. | |
| 2015/0211579 A1 * | 7/2015 | Lawrence | F16C 33/74 |
| | | | 384/125 |
| 2016/0091017 A1 * | 3/2016 | Mueller | F16C 17/22 |
| | | | 384/125 |

\* cited by examiner

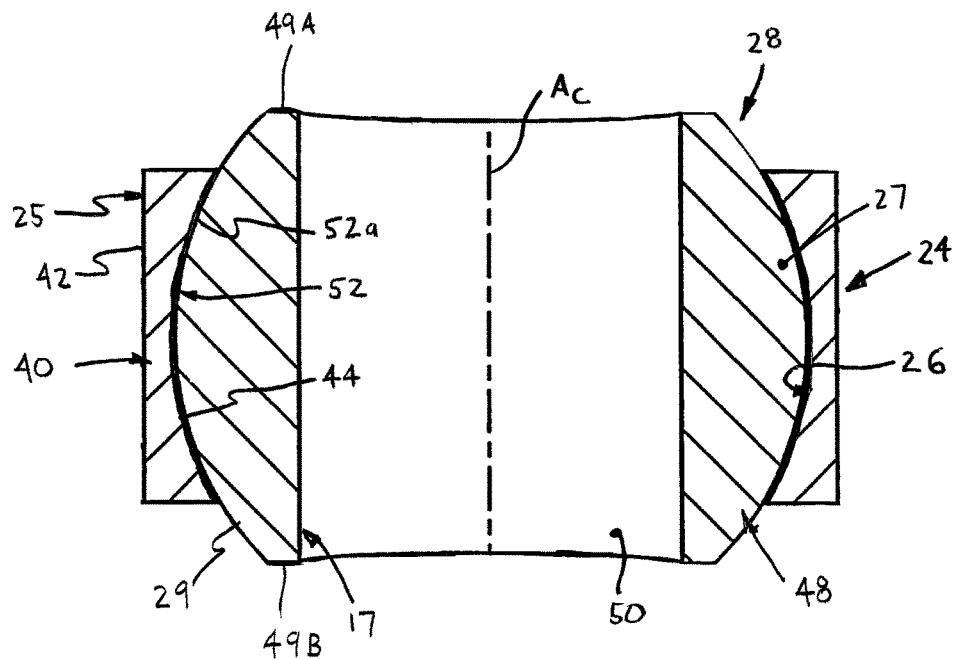
FIG. 8
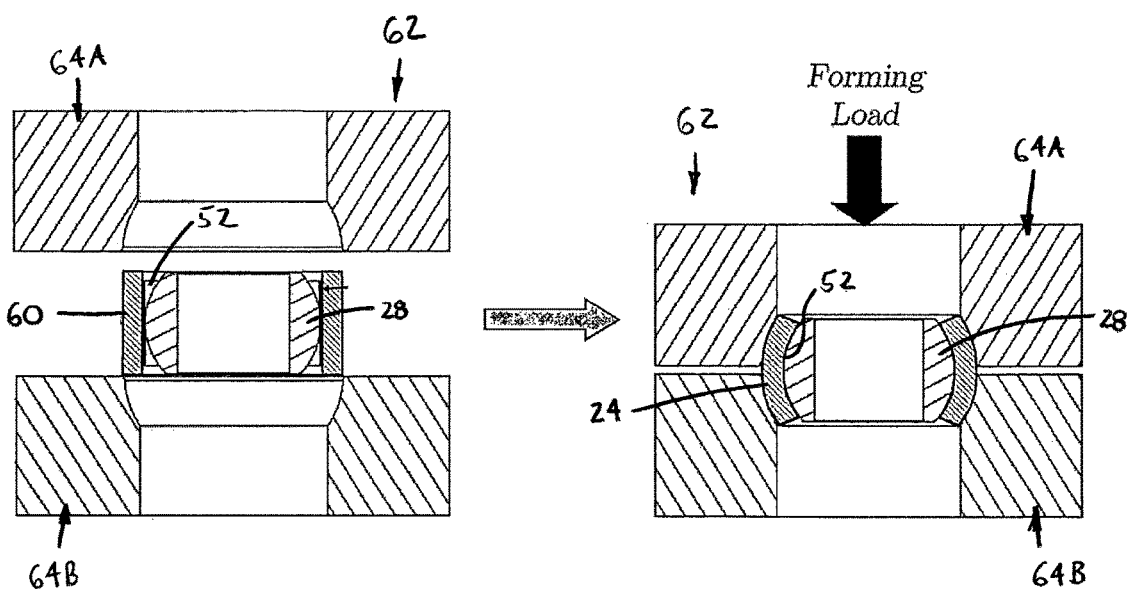
FIG. 9A
FIG. 9B

COMBINATION SPHERICAL AND LAMINATED BEARING ASSEMBLY The present application claims the benefit of U.S. Provisional Patent Application No. 62/115,437 filed Feb. 12, 2015, the entire contents of which are hereby incorporated by reference.

BACKGROUND AND SUMMARY OF THE INVENTION

The present invention relates to bearings, and more particularly to laminated bearing assemblies used to movably couple components of rotary wing aircraft.

Laminated bearings are known and are typically formed of a plurality of alternating annular or cylindrical layers of elastomer and metal and generally include a central bore for receiving a shaft or pin. Such bearings are capable of supporting pivoting or limited partial rotation or twisting motions of the pin or shaft, or a link or other member coupled by the pin/shaft to a housing, bracket, etc. However, when such pivoting or twisting of the shaft, link, etc. is greater than a certain angular magnitude, the elastomeric layers can become damaged, particularly after prolonged use.

SUMMARY OF THE INVENTION

In one aspect, the present invention is a bearing assembly for coupling first and second members, at least one of the first and second members being movable relative to the other one of the first and second members. The bearing assembly comprises a housing coupled with the first member or integrally formed with the first member, the housing having a central bore. A laminated bearing section and a spherical bearing section are each disposed within the housing bore, one of the laminated bearing section and the spherical bearing section is disposed within the other one of the laminated bearing section and the spherical bearing section and is configured to connect with the second member. The laminated bearing section includes a generally cylindrical body formed of a plurality of alternating, generally tubular, substantially flexible laminae and generally tubular, substantially rigid laminae nested coaxially about a central axis. The laminated bearing section is configured such that at least a portion of the laminated bearing section flexes when torque on at least one of the first and second members has a value less than a predetermined value. Further, the spherical bearing section includes a generally annular outer race having a concave inner circumferential surface, the inner surface being partially spherical and defining a bore, and a partially spherical inner member disposed within the outer race bore. The inner member has a convex, partially spherical outer surface disposed against the inner surface of the outer race portion. The spherical bearing section is configured such that the spherical bearing inner member slidably displaces within the spherical bearing outer member when torque on the at least one of the first and second members has a value of at least the predetermined value.

In another aspect, the present invention is again a bearing assembly for coupling first and second members, at least one of the first and second members being movable relative to the other one of the first and second members. The bearing assembly comprises a housing coupled with the first member or integrally formed with the first member, the housing having a central bore. A laminated bearing section disposed within the housing bore and including a generally cylindrical body formed of a plurality of alternating, generally tubular elastomeric laminae and generally tubular metallic laminae nested coaxially about a central axis. A spherical bearing section includes a generally annular outer race having a concave inner circumferential surface, the inner surface being partially spherical and defining a bore, and a partially spherical inner member disposed within the outer race bore. The inner member has a convex, partially spherical outer surface disposed against the inner surface of the outer race portion and is coupled with the second member. Further, the laminated bearing section is configured such that at least a portion of the laminated bearing section flexes when torque on at least one of the first and second members has a value less than a predetermined value and the spherical bearing section is configured such that the spherical bearing inner member slidably displaces within the spherical bearing outer member when torque on the at least one of the first and second members has a value of at least the predetermined value.

In a further aspect, the present invention is a mechanical assembly for a rotary wing aircraft. The assembly comprises a rod having an end with a bore, a pin configured to connect the rod with the aircraft, and a bearing assembly as described in either one of two previous paragraphs.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 8 is an enlarged axial cross-sectional view of the spherical bearing section;

FIGS. 9A and 9B, collectively FIG. 9, are each an axial cross-sectional view of a stage in a die-forming operation for fabricating the spherical bearing section;

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Figure 10:
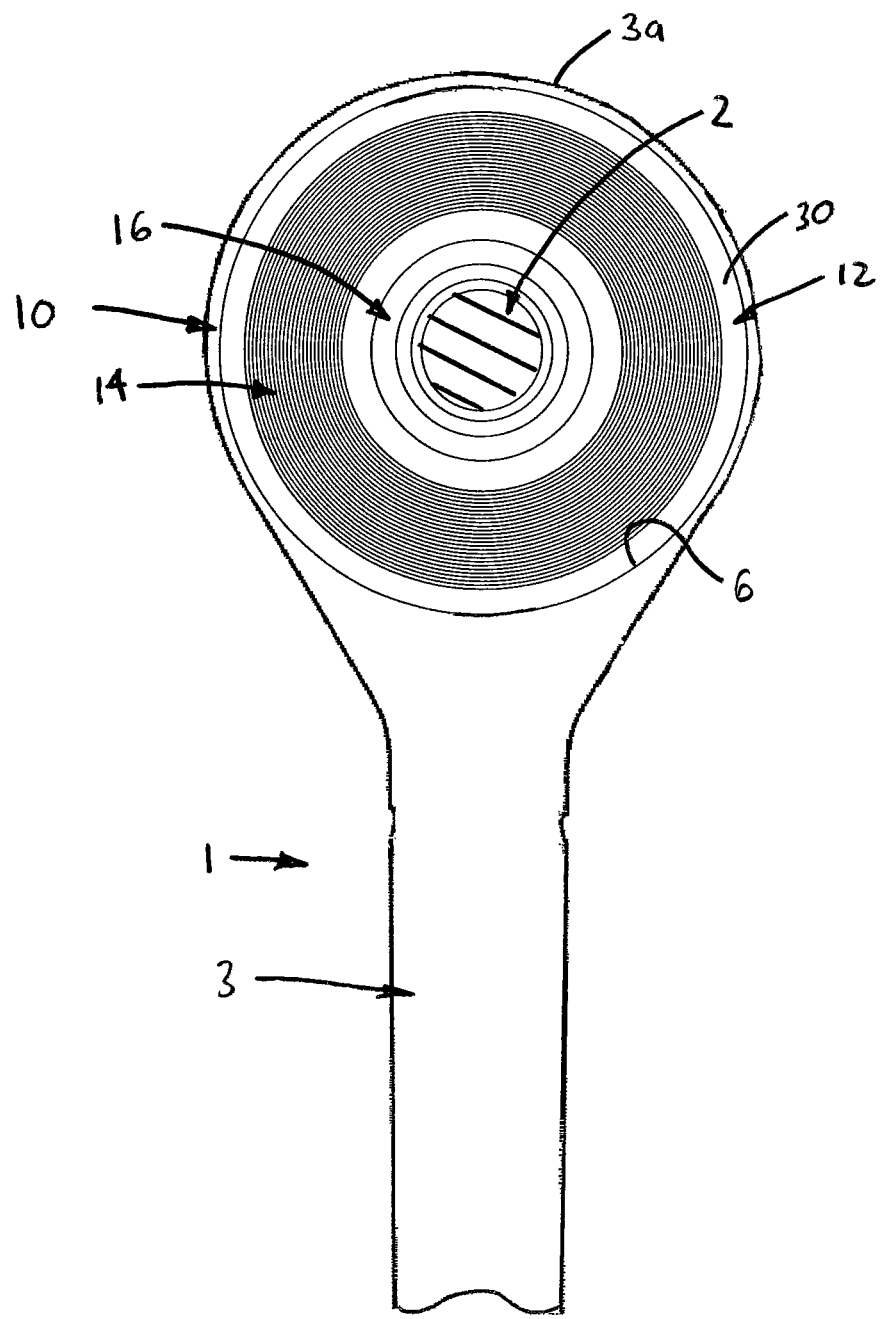
FIG. 10 is a top plan view of the bearing assembly shown in a rod end providing a first member.
Figure 11:
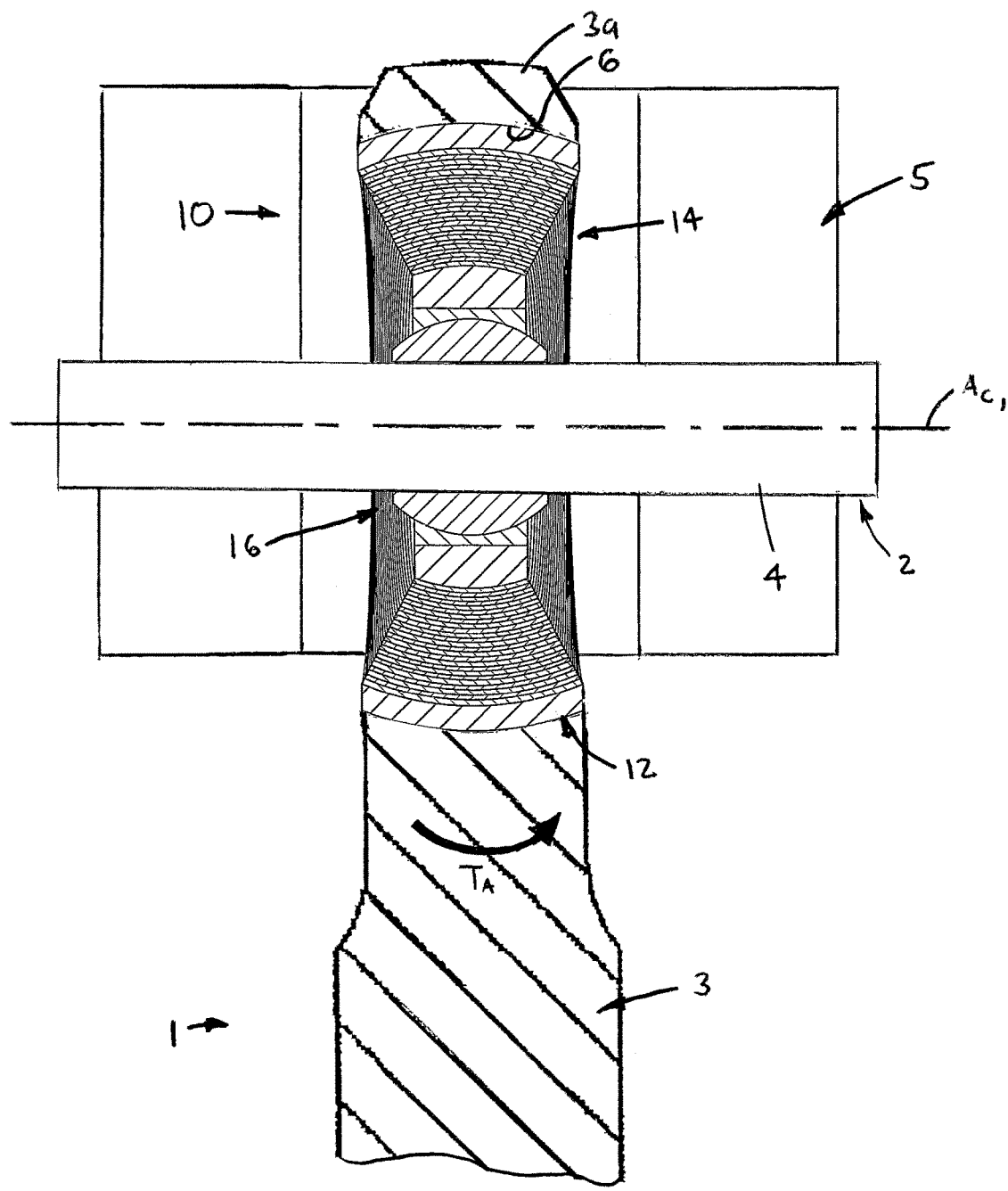
FIG. 11 is an axial cross-sectional view of the bearing assembly of FIG. 10 shown installed in a frame or bracket of a rotary aircraft blade assembly.
Figure 12:
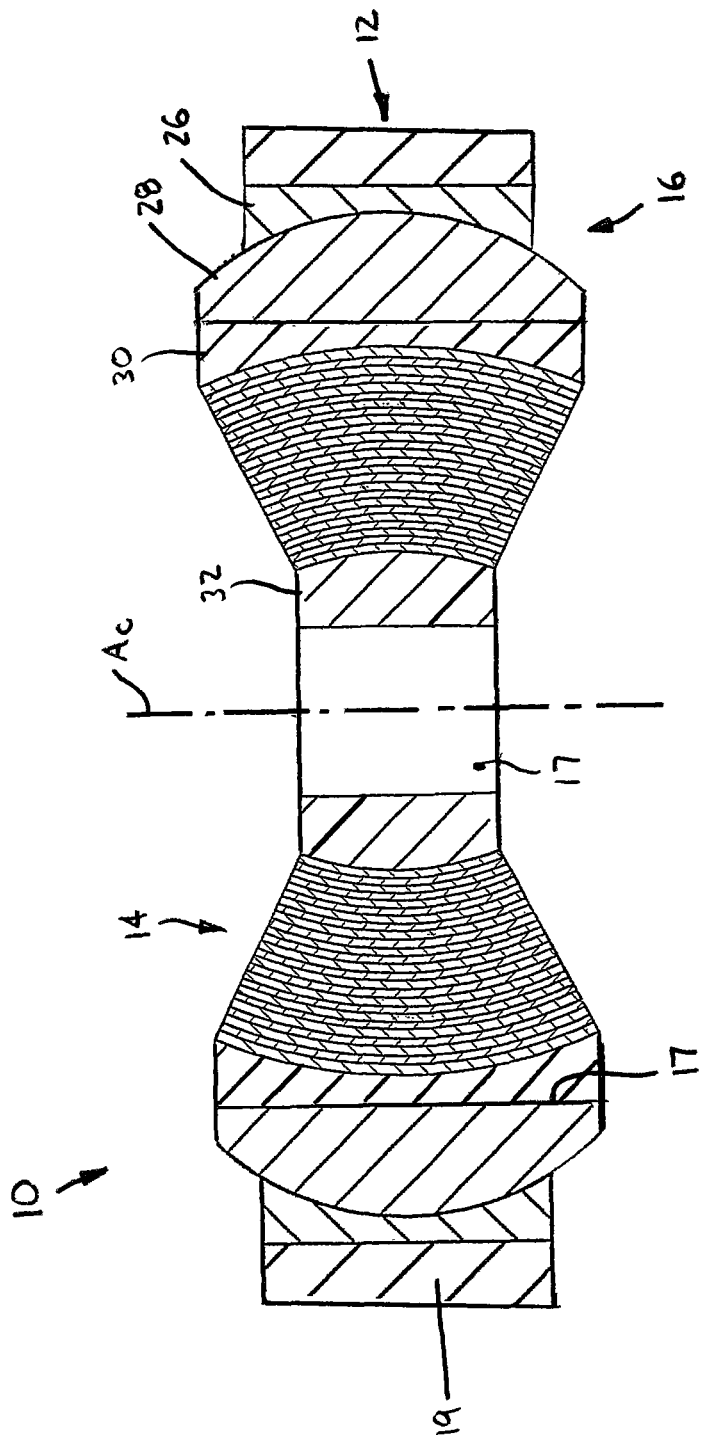
FIG. 12 is an axial cross-sectional view of an alternative bearing construction, showing a laminated bearing section disposed within a spherical bearing section.

Referring now to the drawings in detail, wherein like numbers are used to indicate like elements throughout, there is shown in FIGS. 1-12 a combination or "fusion" bearing assembly 10 for coupling first and second members 1, 2, at least one of the first and second members 1, 2 being movable relative to the other one of the first and second members 1, 2. Preferably, the first and second members 1, 2 are components of rotary aircraft wing assembly, such as an adjustment rod 3 and a pin 4 for connecting the rod end 3a to a frame 5, as shown in FIG. 11, but may be any other appropriate components. The bearing assembly 10 basically comprises a housing 12, a laminated bearing section 14 and a spherical bearing section 16, the two bearing sections 14, 16 each being disposed within the housing 12. The housing 12 is either coupled with or integrally formed with the first member 1 and has a central bore 13. Either the spherical bearing section 16 is disposed within the laminated bearing section 14, as shown in FIGS. 1-5, 7 and 8, or the laminated bearing section 14 is disposed within the spherical bearing section 16, as depicted in FIG. 12, and the innermost one of the bearing sections 16, 18 is configured to connect with the second member 2.

More specifically, in certain preferred constructions, the laminated bearing section 14 is sized diametrically larger than the spherical bearing section 16 and has a central bore 15 sized to receive the spherical bearing section 16, such that the spherical section 16 is disposed within the laminated section bore 15 (FIG. 7), as shown in FIGS. 1-5, 7 and 8. In such an arrangement, the spherical bearing section 16 preferably has a bore 50 for receiving a portion of the second member 2, or a component connected therewith. In other constructions, the spherical bearing section 16 is sized diametrically larger than the laminated bearing section 14 and has a central bore 17 sized to receive the laminated bearing section 14, such that the laminated section 14 is disposed within the spherical section bore 17, as depicted in FIG. 12.

Figure 6:
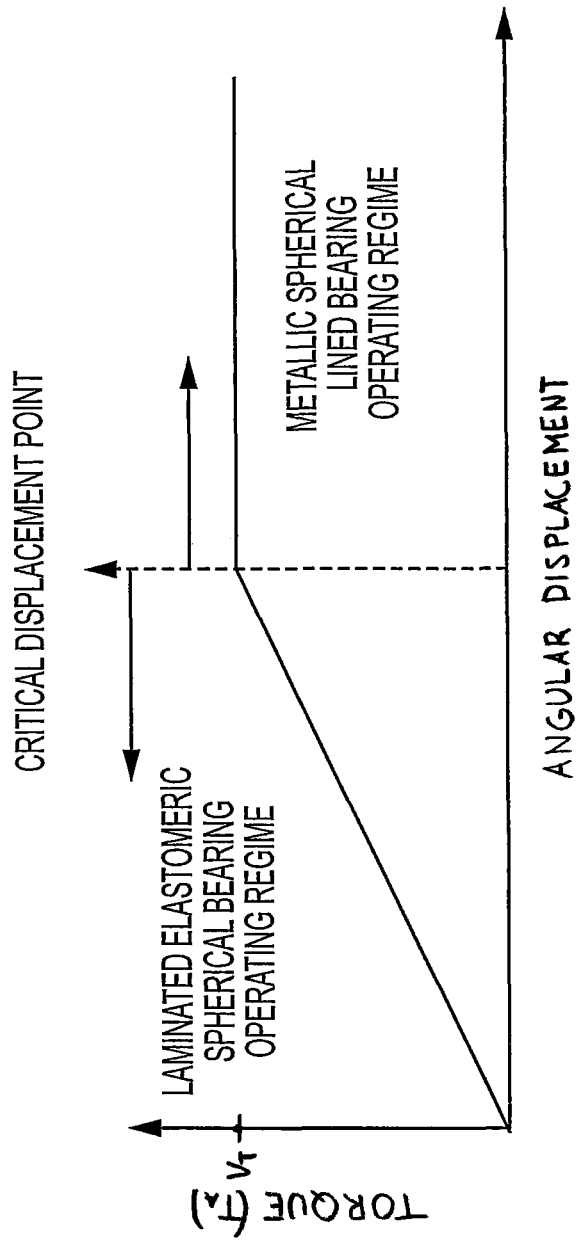
FIG. 6 is a graph showing torque on the bearing vs. displacement of the second member.

In either case, the laminated bearing section 14 includes a generally cylindrical body 18 formed of a plurality of alternating, generally tubular, substantially flexible laminae 20 and generally tubular, substantially rigid laminae 22 nested coaxially about a central axis $A_C$. The laminated bearing section 14 is configured such that at least a portion of the laminated bearing section 14 flexes or deflects (e.g., pivots and/or twists) when torque $T_A$ on the first member 1 and/or the second member 2 has a value or magnitude of less than a predetermined value $V_P$, referred to as the "break-out torque", as indicated in FIG. 6. Specifically, at least one and preferably a plurality of the flexible laminae 20 are each compressed, extended and/or twisted relative to a pair of coaxially or radially adjacent rigid laminae 22 (i.e., on each radial side of the specific lamina 20) during flexure of the laminated bearing section 14, to thereby enable or accommodate angular displacements of the second member 2 relative to the first member 1, whether "twisting" about a central axis 2a or pivoting in direction perpendicular to the central axis 2a. It should be noted that the torque $T_A$ may be applied directly to either one the first and second members 1, 2 by an external component (e.g., a pin driving a rotary blade adjustment link 3) and is transferred to the other member 1 or 2, such that about the same amount of torque is exerted on both members 1, 2.

Further, the spherical bearing section 16 includes a generally annular outer race 24 having a concave inner circumferential surface 26, the inner surface 26 being partially spherical and defining a bore 27, and a partially spherical inner member 28 disposed within the outer race bore 27. The spherical bearing section inner member 28 has a convex, partially spherical outer surface 29 disposed generally against the inner surface 26 of the outer race 24, either directly against or through contact with a liner 52 disposed on the outer race inner surface 26, as discussed below. Furthermore, the spherical bearing section 16 is configured such that the spherical bearing inner member 28 slidably displaces within the spherical bearing outer race 24 when torque $T_A$ on the one of the first and second members 1, 2 has a value/magnitude of at least (i.e., equal to or greater than) the predetermined value $V_P$.

Figure 1:
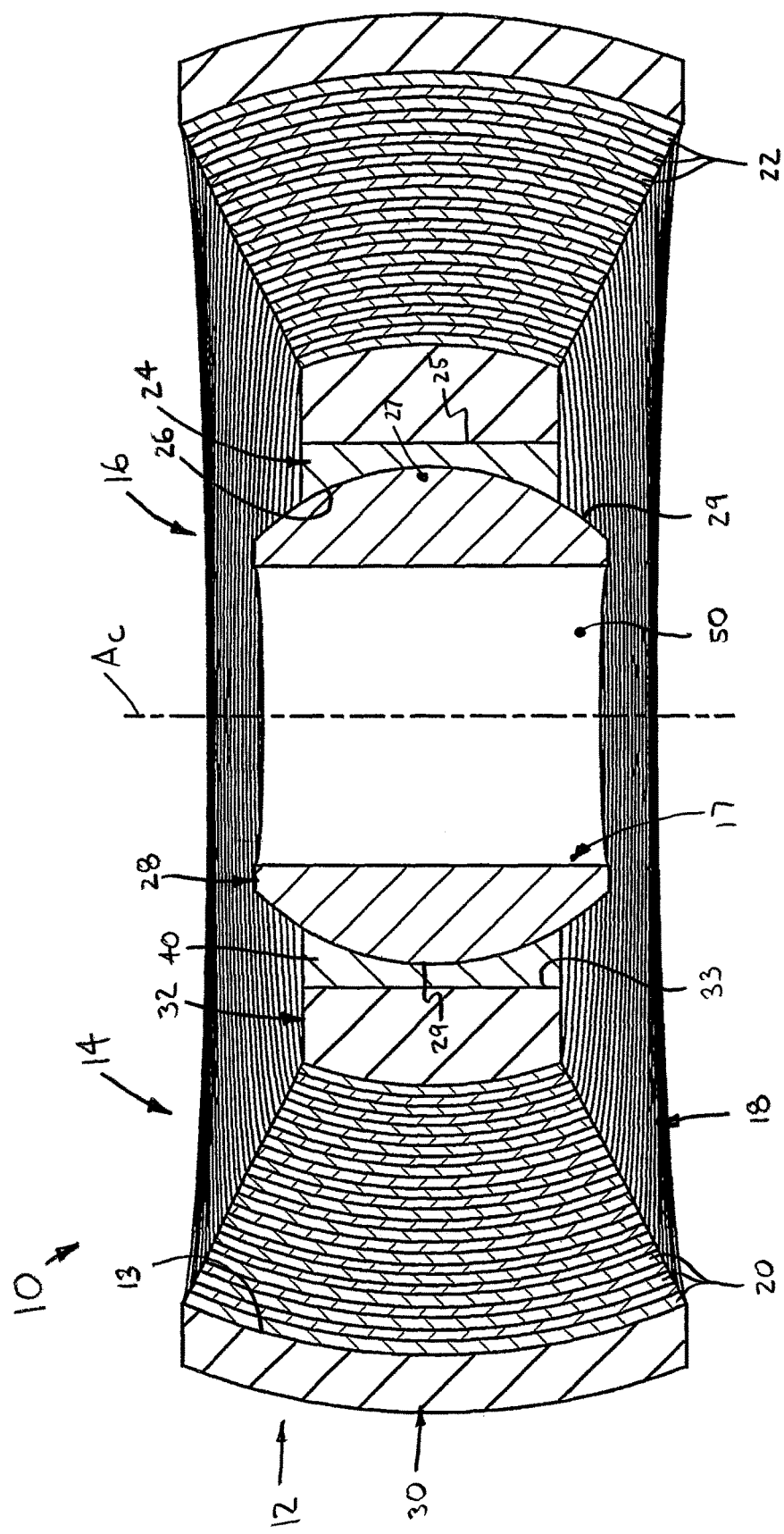
FIG. 1 is an axial cross-sectional view through a bearing assembly in accordance with the present invention.
Figure 2:
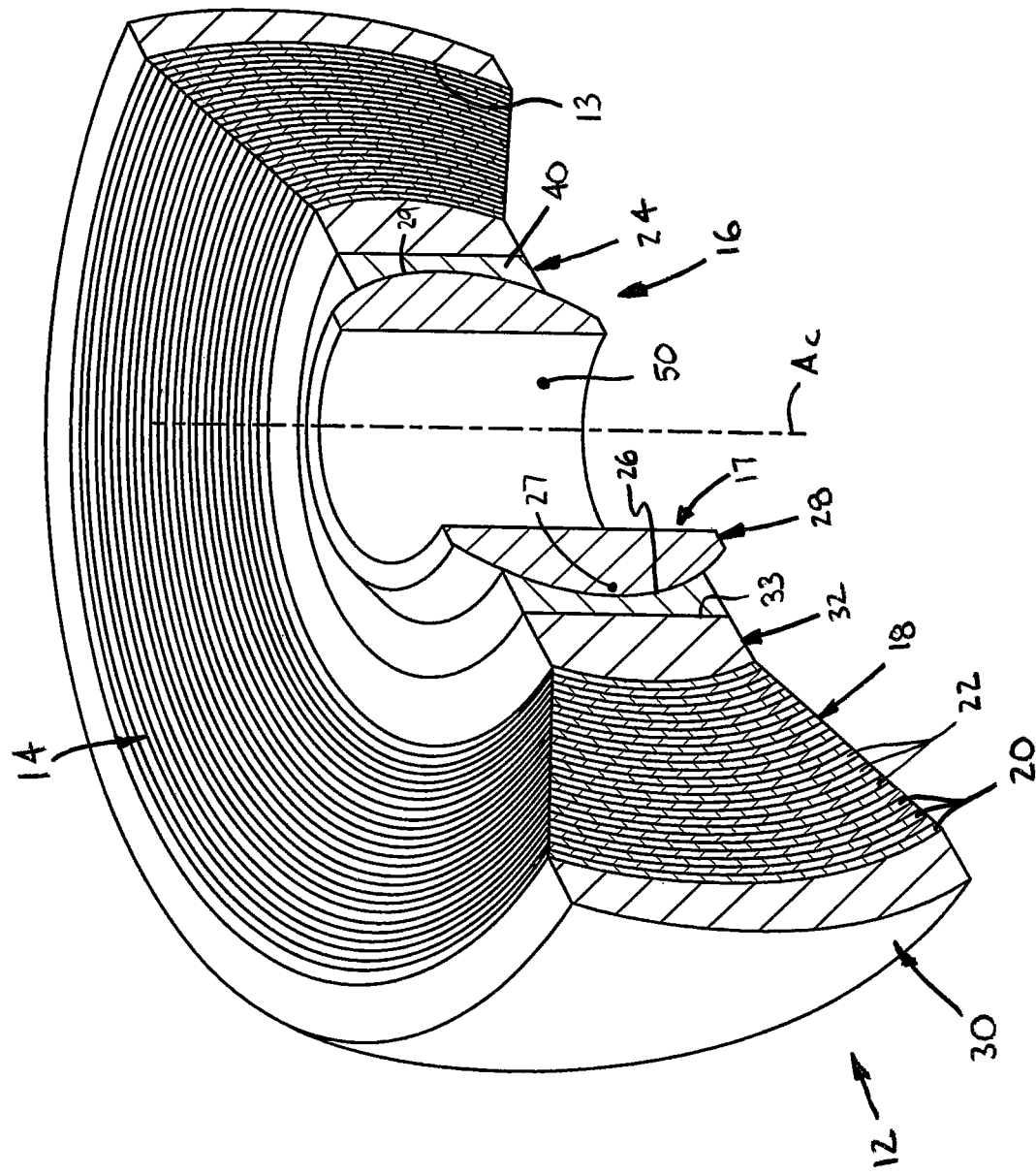
FIG. 2 is a perspective view of FIG. 1.
Figure 3:
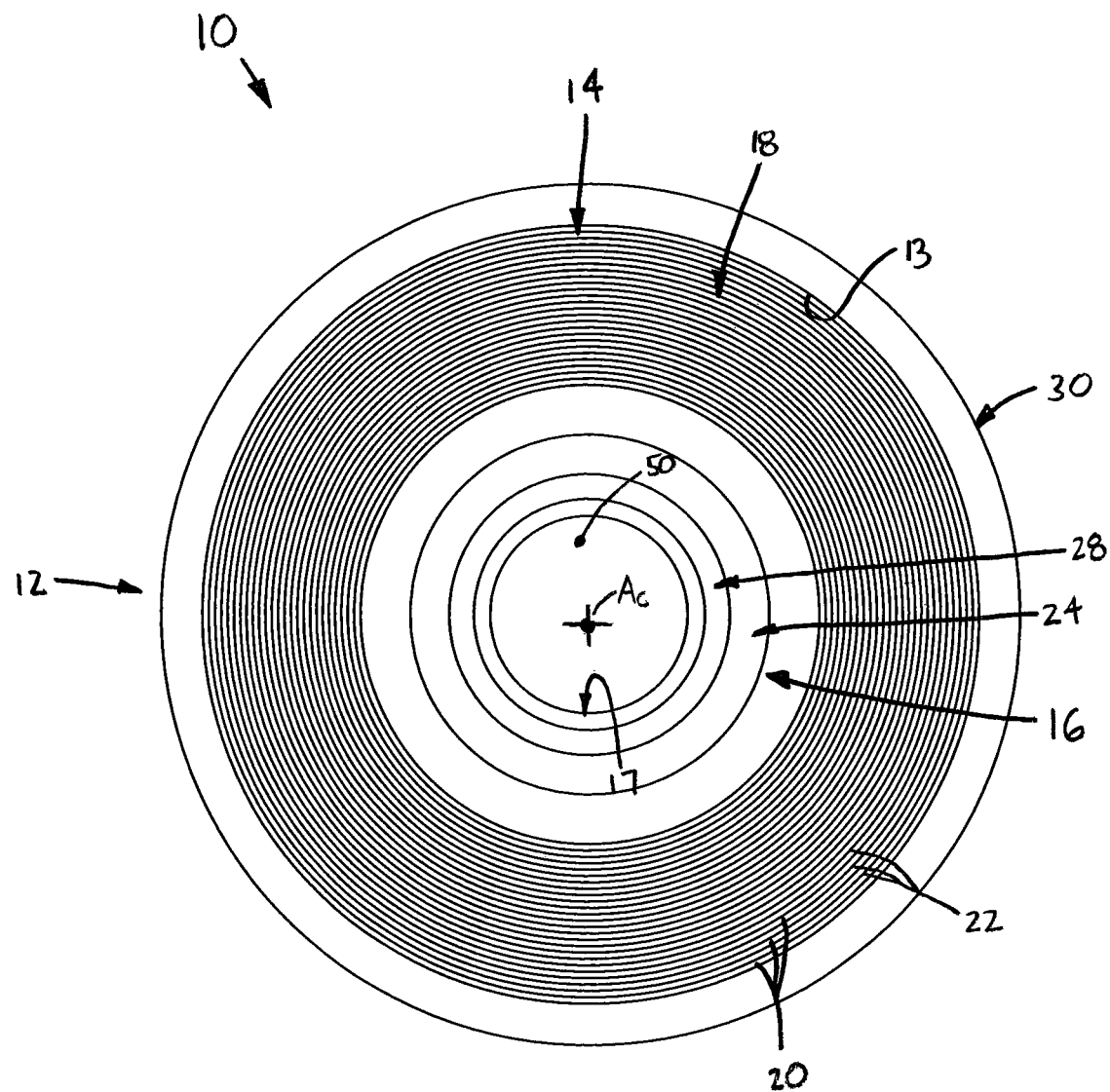
FIG. 3 is a top plan view of the bearing assembly.
Figure 4:
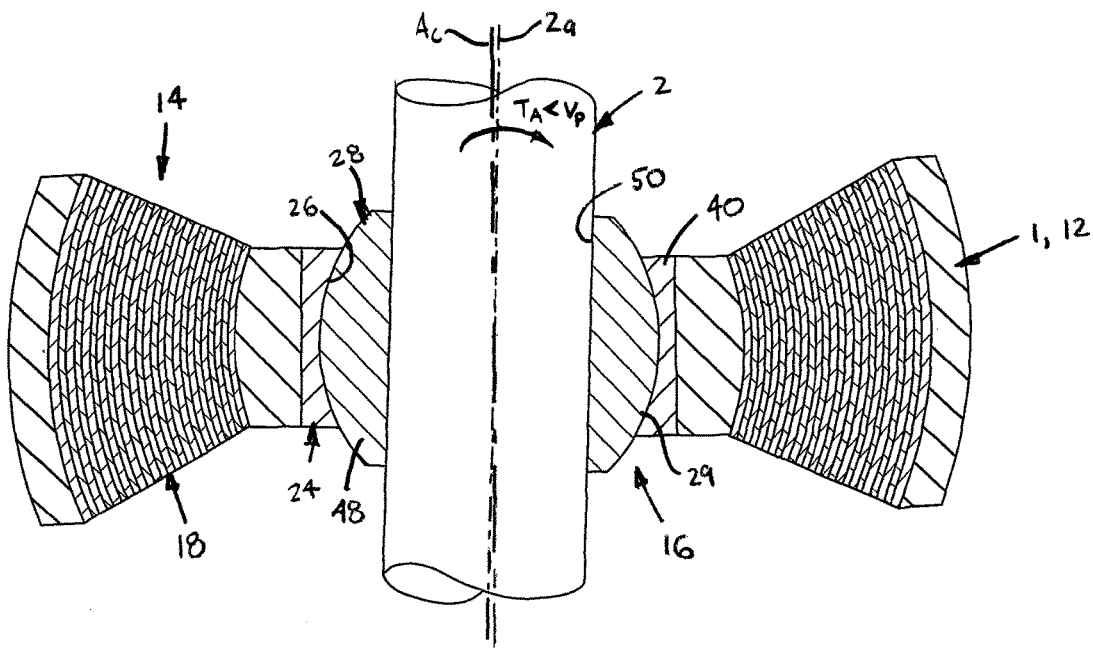
FIG. 4 is an axial cross-sectional view of the bearing assembly showing a laminated bearing section "flexing" at a relatively lesser angular displacement of a second member.
Figure 5:
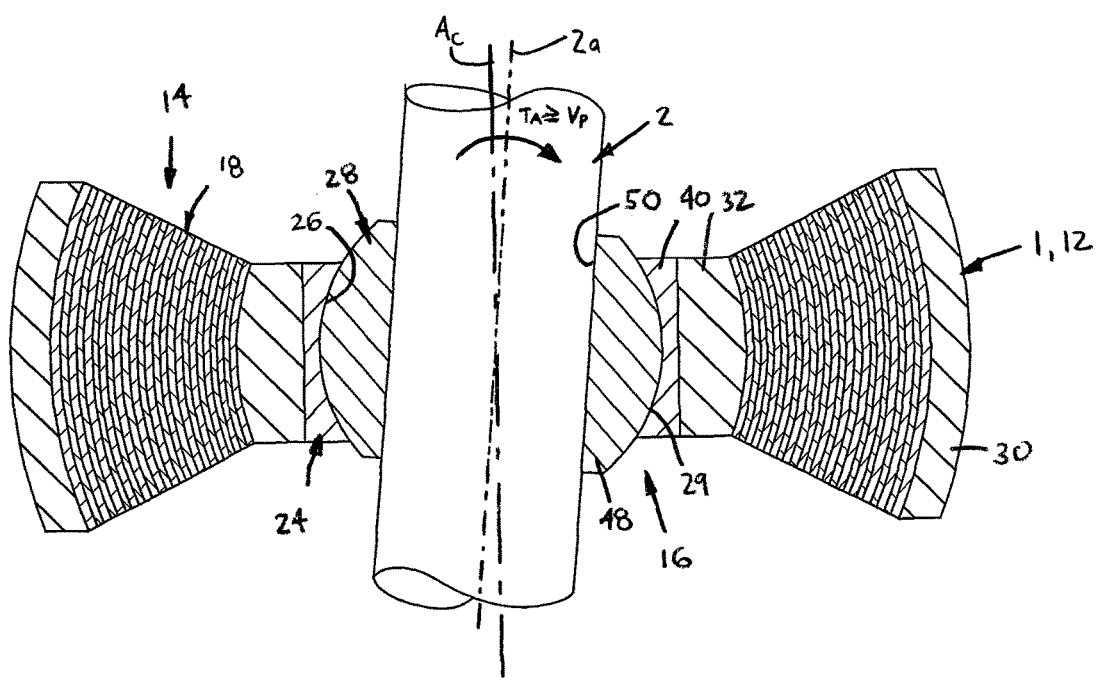
FIG. 5 is an axial cross-sectional view of the bearing assembly showing an inner member of a spherical bearing section slidably displacing during relatively greater angular displacement of the second member.

More specifically, the spherical bearing section 16 is configured such that the spherical bearing inner member 28 remains substantially stationary relative to the spherical bearing outer member when torque $T_A$ on the first member 1 and/or second member 2 is less than the predetermined "breakout" value $V_P$. As such, the only movement within the bearing 10 is flexing or deflecting of at least a portion of the laminated bearing section 14 at lower torque levels, as discussed in greater detail below. However, when torque $T_A$ on the first and/or second members 1, 2 is greater than or equal to the predetermined, break-out value $V_P$, the spherical bearing inner member 28 slides within the spherical bearing outer race 24 while the elastomeric bearing section 14 remains "unflexed" or returns to the initial or unflexed state (e.g., FIGS. 1 and 2), as depicted in FIG. 5. Thus, the combination bearing assembly 10 is capable of accommodating both low cycle extreme motions, or angular displacements, and motions/displacements of a relatively greater magnitude, by movement of the spherical bearing inner member 28, without adversely affecting the usable life of the elastomeric bearing section 14, as discussed in further detail below.

Referring to FIGS. 1-5, 10 and 11, in certain constructions, the housing 12 is formed as an outer base member 30 of the laminated bearing section 14, as described below, which is disposed within a bore 6 of the first member 1, such as a link or rod 3 of a rotary aircraft wing assembly, as best shown in FIGS. 10 and 11, but may alternatively be integrally formed with the link/rod 3 (not shown), such as by bonding an outermost flexible lamina 20 to the inner surface of the bore 6. In other constructions, the housing 12 may be a separate casing, such as a circular cylindrical shell 19 (FIG. 12) within which the bearing portions 14, 16 are fixedly or removably assembled. When formed as a separate component, the housing 12 is attached to or mounted on the first member 1 by any appropriate means, such as by assembling the housing 12 into a bore or cavity in the first member 1, by mounting the housing 12 on a frame or bracket (neither shown), which may be the first member 1 or a component attached to the first member 1, etc.

Referring now to FIGS. 1-5, 7 and 12, the laminated bearing section 14 preferably further includes outer and inner annular base members 30, 32, respectively, with the plurality of flexible and rigid laminae 20, 22 being disposed between the two base members 30, 32. The outer base member 30 provides the housing 12 in certain constructions, as depicted in FIGS. 1-5 and 7, and the inner base member 32 has an inner circumferential surface 33 providing the laminated bearing section bore 15 (indicated in FIG. 7). The inner base member bore 15 either receives the spherical bearing section 16 (FIGS. 1-5 and 7) or the second member 2 (or a component connected therewith) (FIG. 12). The outer base member 30 may be disposeable within a bore 6 in the first member 1 (FIGS. 10 and 11) or within a bore 50 of the spherical bearing inner member 28 (FIG. 12), as discussed in further detail below. However, the laminated bearing section 14 may alternatively be formed without the two annular base members, for example, with an innermost flexible lamina 20 being bonded to an outer surface 25 of the outer race 24 of the spherical bearing section 16 and an outermost flexible lamina 20 bonded to an inner circumferential surface (not indicated) of a housing 12 that is integrally formed with the first member 1 (structure not shown).

Figure 7:
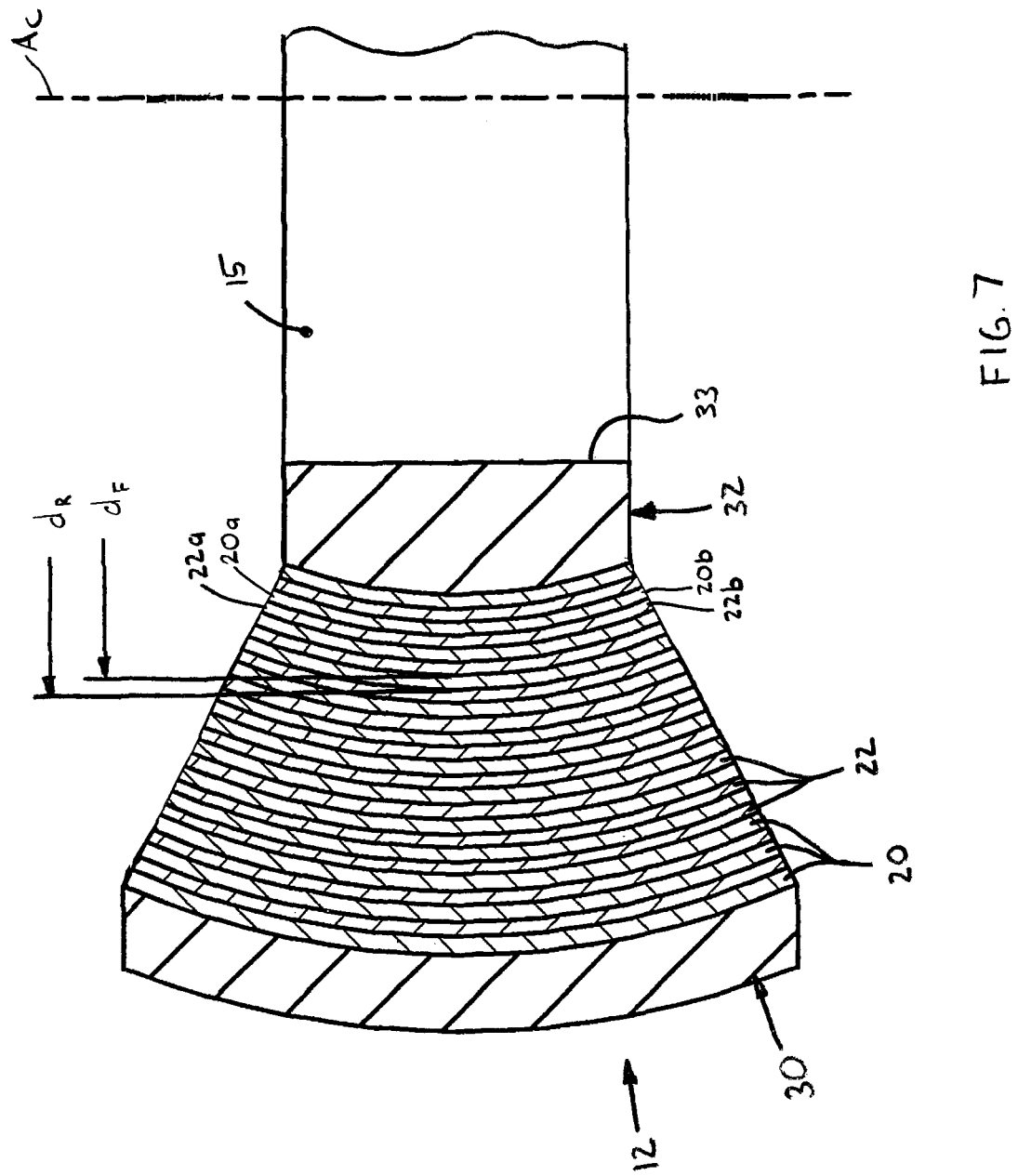
FIG. 7 is an enlarged axial cross-sectional view of a portion of the laminated bearing section.

Referring particularly to FIG. 7, the laminated bearing section 14 is preferably formed by disposing or interposing alternating layers of flexible laminae 20 and rigid laminae 22 such that each flexible layer/lamina 20 is surrounded circumferentially by a diametrically larger rigid lamina 22, and vice-versa. In other words, each one of the flexible and rigid laminae 20, 22 has an outside diameter $d_F$, $d_R$ and the plurality of laminae 20, 22 are arranged such that each one of the laminae 20, 22 is disposed within all of the other laminae 20, 22 having an outside diameter $d_F$, $d_R$ greater than the outside diameter $d_F$ or $d_R$ of the one lamina 20 or 22. Preferably, the laminated bearing section 14 is preferably formed such the thickness or axial length of the laminae 20, 22 increases in a direction radially outwardly from the central axis $A_C$. Specifically, each one of the flexible laminae 20 and each one of the rigid laminae 22 has opposing axial ends 22a, 22b or 22a, 22b, respectively, and an axial length (not indicated) between the opposing axial ends 22a, 22b and 22a, 22b. The plurality of laminae 20, 22 are arranged such that the axial length of each one of the laminae 20, 22 is greater than the axial length of all laminae 20, 22 disposed within the one laminae 20, 22. Furthermore, each one of the flexible and rigid laminae 20, 22 is preferably partially spherical, as depicted in the drawing figures, but may alternatively be substantially circular cylindrical or any other appropriate shape.

Preferably, each one of the flexible laminae 20 is formed of an elastomer, such as for example, natural or synthetic rubber, and each one of the rigid laminae 22 is formed of a metallic material, such as steel or aluminum, but may be formed of any other appropriate rigid material, such as a ceramic material, a rigid polymer or plastic, etc. Each one of the rigid laminae 22 may include a single, generally cylindrical shell or may be formed of a plurality of arcuate shells spaced circumferentially about the central axis $A_C$. Further, each flexible lamina 20 is preferably bonded to both a radially-inner adjacent rigid lamina 22 and to a radially-outer adjacent rigid lamina 22. Most preferably, all of the flexible laminae 20 are molded to the rigid laminae 22 under compression such that each flexible lamina 20 has a compressive "preload" between the associated radially adjacent pair of rigid laminae 22.

Referring now to FIGS. 1-5, 8, 9 and 12, the outer race 24 of the spherical bearing section 16 is preferably formed as a generally circular tube 40 having a circular cylindrical outer surface 42 providing the outer surface 25 and a concave inner circumferential surface 44 providing the partially spherical inner surface 26. In certain preferred constructions, the outer race 24 is sized to fit within the laminated bearing portion base member 32 with a press or interference fit between the juxtaposed surfaces 33, 42, but may instead be retained within the laminated bearing section 14 by any other appropriate means (e.g., threads, staking, fasteners, key(s), etc.). The inner member 28 is preferably formed as a partially circular ball 48 with generally flat axial end surfaces 49A, 49B and a central bore 50 extending between the end surfaces 49A, 49B. Preferably, both the outer race 24 and the inner "ball" member 28 are each formed of a metallic material, such as for example steel, but may be formed of any other appropriate material, for example, a ceramic material.

In one preferred embodiment depicted in FIGS. 1-5, 8 and 9, the central bore 50 of the spherical inner member 28 is sized to receive a portion of the second member 2, such as a shaft or pin 4 as shown in FIGS. 4, 5 10 and 11, or a component connected with the second member 2. However, the inner ball member 28 may alternatively be formed substantially solid without any bore, and instead be configured to connect one end surface 49A or 49B with the second member 2 or may have a projection or other means (none shown) for connecting the ball 48 with the second member 2. In the alternative embodiment shown in FIG. 12, the spherical bearing section 18 is sized diametrically larger than the laminated bearing section 14, such that the inner member central bore 50 is sized to receive the laminated bearing section 14. As such, when the inner member 28 slidably displaces relative to the outer race 24, the entire laminated bearing section 14 displaces with the spherical bearing section inner member 28 without flexing.

As best shown in FIG. 8, the spherical bearing section 16 preferably includes a relatively thin liner 52 formed on the outer race inner surface 26 so as to be disposed about and against the outer surface 29 of the inner member 28. The liner 52 is formed of a lubricous material, such as for example, polytetrafluoroethylene ("PTFE"). With the preferred liner 52, the inner ball member 28 of the spherical bearing section 16 frictionally engages the outer race 24 through contact with the liner inner surface 52a. However, in other embodiments, the inner member outer surface 29 directly contacts (i.e., juxtaposed against) the outer race inner surface 26.

In any case, the spherical bearing section outer race 24 and inner member 28 are sized to create a sufficient compressive force exerted by the outer race 24 on the inner ball member 28 such that friction between the inner member 28 and outer race 24 (or liner 52) prevents movement of the inner member 28 relative to the outer race 24 when torque $T_A$ on at least one of the first and second members 1, 2 has a value less than the predetermined value $V_P$. Thus, establishing such compressive stress(es), and thereby generating the frictional force(s) between the inner member 28 and outer race 24 of a magnitude sufficient to prevent relative motion until the breakout torque $V_P$ is applied to the bearing assembly 10 is critical to proper functioning of the assembly 10. Presently, it is preferred to form the spherical bearing section 16 by deforming the spherical bearing outer race 24 at least partially about the spherical bearing inner member 28 so as to minimize clearance between the inner member 28 and outer race 24 and establish the frictional force necessary to provide the predetermined value $V_P$ of torque $T_A$, i.e., the break-out torque. More specifically, the outer race 24 is preferably fabricated from a generally cylindrical tube 60 into which is assembled the inner member 28 (and preferably also a cylindrical liner 52) and then the assembled components 60, 28 are placed within a forming die 62, as shown in FIG. 9A. The upper and lower die halves 64A, 64B are pressed together to form the tube 60 about the spherical bearing inner member 28 in a swaging or "nosing" operation to thereby establish the minimal clearance necessary to provide the required frictional force, as depicted in FIG. 9B. However, the spherical bearing race 24 and inner ball member 28 may be formed and assembled in any other appropriate manner.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:

1. A bearing assembly for coupling first and second members, at least one of the first and second members being movable relative to the other one of the first and second members, the bearing assembly comprising:
    a housing one of coupled with the first member and integrally formed with the first member, the housing having a central bore;
    a laminated bearing section and a spherical bearing section each disposed within the housing bore, one of the laminated bearing section and the spherical bearing section being disposed within the other one of the laminated bearing section and the spherical bearing section and configured to connect with the second member;
    the laminated bearing section including a generally cylindrical body formed of a plurality of alternating, generally tubular, substantially flexible laminae and generally tubular, substantially rigid laminae nested coaxially about a central axis, the laminated bearing section being configured such that at least a portion of the laminated bearing section flexes when torque on at least one of the first and second members has a value less than a predetermined value; and
    the spherical bearing section including a generally annular outer race having a concave inner circumferential surface, the inner surface being partially spherical and defining a bore, and a partially spherical inner member disposed within the outer race bore and having a convex, partially spherical outer surface disposed against the inner surface of the outer race portion, the spherical bearing section being configured such that the spherical bearing inner member slidably displaces within the spherical bearing outer member when torque on the at least one of the first and second members has a value of at least the predetermined value.

2. The bearing assembly as recited in claim 1 wherein the spherical bearing section is configured such that the spherical bearing inner member remains substantially stationary relative to the spherical bearing outer member when torque on the at least one of the first and second members is less than the predetermined value.

3. The bearing assembly as recited in claim 2 wherein the spherical bearing section inner and outer members are sized such that friction between the inner member and the outer member prevents movement of the inner member relative to the outer member when torque on the at least one of the first and second members has a value less than the predetermined value.

4. The bearing assembly as recited in claim 1 wherein at least one of the flexible laminae is at least one of compressed, extended and twisted relative to a pair of coaxially adjacent rigid laminae during flexure of the laminated bearing section.

5. The bearing assembly as recited in claim 1 wherein each one of the flexible and rigid laminae has an outside diameter, the plurality of laminae being arranged such that each one of the laminae is disposed within all of the other laminae having an outside diameter greater than the outside diameter of the one lamina.

6. The bearing assembly as recited in claim 1 wherein each one of the flexible laminae and each one of the rigid laminae has opposing axial ends and an axial length between the opposing axial ends, the plurality of laminae being arranged such that the axial length of each one of the laminae is greater than the axial length of all laminae disposed within the one laminae.

7. The bearing assembly as recited in claim 6 wherein each one the flexible and rigid laminae is partially spherical.

8. The bearing assembly as recited in claim 1 wherein each one of the flexible laminae is formed of an elastomer and each one of the rigid laminae is formed of a metallic material.

9. The bearing assembly as recited in claim 1 wherein one of:
    the laminated bearing section has a central bore and the spherical bearing section is disposed within the central bore of the laminated bearing section; and
    the spherical bearing section has a central bore and the laminated bearing section is disposed within the central bore of the spherical bearing section.

10. A bearing assembly for coupling first and second members, at least one of the first and second members being movable relative to the other one of the first and second members, the bearing assembly comprising:
    a housing one of coupled with the first member and integrally formed with the first member, the housing having a central bore;
    a laminated bearing section disposed within the housing bore and including a generally cylindrical body formed of a plurality of alternating, generally tubular elastomeric laminae and generally tubular metallic laminae nested coaxially about a central axis and including a central bore; and
    a spherical bearing section disposed within the central bore of the laminated bearing section body and including a generally annular outer race having a concave inner circumferential surface, the inner surface being partially spherical and defining a bore, and a partially spherical inner member disposed within the outer race bore and having a convex, partially spherical outer surface disposed against the inner surface of the outer race portion, the inner member being coupled with the second member;
    wherein the laminated bearing section is configured such that at least a portion of the laminated bearing section flexes when torque on at least one of the first and second members has a value less than a predetermined value and the spherical bearing section is configured such that the spherical bearing inner member slidably displaces within the spherical bearing outer member when torque on the at least one of the first and second members has a value of at least the predetermined value.

11. A mechanical assembly for a rotary wing aircraft, the assembly comprising:
- a rod having an end with a bore;
- a pin configured to connect the rod with the aircraft; and
- a bearing assembly disposed within the rod bore, configured to movably couple the rod and the pin and including:
  - a housing one of coupled with the rod and integrally formed with the rod, the housing having a central bore;
  - a laminated bearing section and a spherical bearing section each disposed within the housing bore, one of the laminated bearing section and the spherical bearing section being disposed within the other one of the laminated bearing section and the spherical bearing section and configured to connect with the pin;
  - the laminated bearing section including a generally cylindrical body formed of a plurality of alternating, generally tubular, substantially flexible laminae and generally tubular, substantially rigid laminae nested coaxially about a central axis, the laminated bearing section being configured such that at least a portion of the laminated bearing section flexes when torque on at least one of the rod and pin has a value less than a predetermined value; and
  - the spherical bearing section including a generally annular outer race having a concave inner circumferential surface, the inner surface being partially spherical and defining a bore, and a partially spherical inner member disposed within the outer race bore and having a convex, partially spherical outer surface disposed against the inner surface of the outer race portion, the spherical bearing section being configured such that the spherical bearing inner member slidably displaces within the spherical bearing outer member when torque on the at least one of the rod and pin has a value of at least the predetermined value.

* * * * *